United States Patent
Ishizaki et al.

(10) Patent No.: US 6,632,256 B1
(45) Date of Patent: Oct. 14, 2003

(54) METHOD FOR MANUFACTURING A NON-AQUEOUS-GEL-ELECTROLYTE BATTERY

(75) Inventors: Haruo Ishizaki, Miyagi (JP); Naoki Matsuo, Miyagi (JP); Takeharu Kikuchi, Miyagi (JP); Tuyoshi Sugiyama, Miyagi (JP); Kazuhiro Imaizumi, Fukushima (JP); Masayuki Shida, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/529,890

(22) PCT Filed: Sep. 1, 1999

(86) PCT No.: PCT/JP99/04746

§ 371 (c)(1),
(2), (4) Date: Jun. 26, 2000

(87) PCT Pub. No.: WO00/13252

PCT Pub. Date: Mar. 9, 2000

(30) Foreign Application Priority Data

Sep. 1, 1998 (JP) ............................................ 10-246463

(51) Int. Cl.$^7$ ................................................ H01M 6/00
(52) U.S. Cl. ...................................... 29/623.5; 29/623.3
(58) Field of Search ................................ 429/300, 303, 429/188, 304, 305, 326, 324, 330, 332; 29/623.5, 623.3, 623.1; 252/62.2

(56) References Cited

U.S. PATENT DOCUMENTS

| | | | |
|---|---|---|---|
| 5,240,790 A | * 8/1993 | Chua et al. | ............... 429/190 |
| 5,637,421 A | * 6/1997 | Poehler et al. | ............... 429/190 |
| 5,962,168 A | * 10/1999 | Denton, III | ............... 429/303 |
| 6,019,803 A | * 2/2000 | Oskam et al. | ............... 29/623.5 |
| 6,172,152 B1 | * 1/2001 | Kim et al. | ............... 524/104 |
| 2001/0010881 A1 | * 8/2001 | Ehrlich | ............... 429/302 |

FOREIGN PATENT DOCUMENTS

JP 10-3945 * 1/1998 .......... H01M/10/40

* cited by examiner

Primary Examiner—Stephen Kalafut
Assistant Examiner—Raymond Alejandro
(74) Attorney, Agent, or Firm—Sonnenschein, Nath & Rosenthal LLP

(57) ABSTRACT

The surface of a positive-electrode active material layer or a negative-electrode an active material layer is coated with a gel electrolyte composition to form a gel electrolyte layer. The positive and negative electrodes are laminated such that the gel electrolyte layer is sandwiched. At this time, the gel electrolyte composition is formed into a sol form so as to be applied to the surface of the positive-electrode active material layer or the negative-electrode active material layer. The viscosity of the gel electrolyte composition formed into the sol form is 1 cp to 50 cp. The gel electrolyte composition is formed into the sol form by heating the gel electrolyte composition or diluting the gel electrolyte composition with nonaqueous solvent. When dilution with the nonaqueous solvent is performed, solvent having a high boiling point and solvent having a low boiling point are mixed with each other. After a coating operation has been completed, the solvent having the low boiling point is removed by vaporization. It is effective to heat the positive electrode or the negative electrode when the gel electrolyte composition formed into the sol is applied. Since the gel electrolyte composition formed into the sol form is applied, the electrolytic solution is able to quickly penetrate the active material layer.

20 Claims, 4 Drawing Sheets

METHOD FOR MANUFACTURING A NONAQUEOUS-GEL-ELECTROLYTE BATTERY

FIELD OF THE INVENTION

The present invention relates to a method of manufacturing a nonaqueous-gel-electrolyte battery which is capable of generating high voltage and exhibiting great discharge energy.

BACKGROUND OF THE INVENTION

In recent years batteries have been used as important power sources for portable electronic apparatus. In particular, secondary batteries have been employed as batteries for operating portable electronic apparatuses from a viewpoint of advantages of economic merits and saving of resources. Therefore, purposes of the secondary batteries have rapidly been increased in recent years.

There are requirements for reducing the size and weight of the portable electronic apparatus. Also the portable electronic apparatus does not require a large accommodating space in the apparatus. To prevent enlargement of the overall weight of the electronic apparatus, reduction in the weight of the battery has been required. Moreover, permission of use of the battery for a long time has been required. That is, size reduction and improvement in the performance of the portable electronic apparatus cause the size and weight of the adaptable battery to be reduced and the performance to be improved.

To meet the above-mentioned various requirements, nonaqueous lithium secondary battery has attracted attention because of its higher energy density and output density as compared with those of lead batteries and nickel-cadmium batteries.

The nonaqueous lithium secondary battery is a battery of a type which uses an electrochemical reversible reaction with which lithium contained in the positive electrode is, during a charge operation, occuluded in the negative electrode through the electrolytic solution. During a discharge operation, lithium in the negative electrode is occuluded in the positive electrode through the electrolytic solution. As the electrolytic solution, a nonaqueous solvent prepared by dissolving lithium salt is employed.

To prevent leakage of the electrolytic solution, a metal container having rigidity, that is, a so-called hard cell (a positive electrode cover and a negative electrode can) is employed as the case.

However, the foregoing metal hard cell suffers from a problem in that the hard cell cannot satisfactorily meet the above-mentioned requirements for reducing the weight, size and the thickness. Moreover, raising of a degree of freedom permitted when the shape of the secondary battery is designed has been required because the size of the electronic apparatus has furthermore been reduced. The metal hard cell cannot satisfactorily meet the requirement about the shape. It is very difficult to manufacture, for example, a sheet battery having a small thickness and a large area, a card battery having a small thickness and a small area and a flexible battery having a great degree of freedom.

As an effective means for solving the above-mentioned problems, it might be considered feasible to manufacture a battery incorporating an inorganic or organic and perfect solid electrolyte or a semi-solid electronic apparatus constituted by polymer gel. Specifically, a so-called solid electrolyte battery and a nonaqueous-gel-electrolyte battery (also called a "polymer lithium battery" or simply called a "polymer battery") have been suggested each of which incorporates a polymer and solid electrolyte composed of polymer and an electrolyte or a gel electrolyte prepared by adding nonaqueous electrolyte to matrix polymer as a plasticizer.

The nonaqueous-gel-electrolyte battery has a positive electrode incorporating a positive-electrode collector on which an active material layer of the positive electrode is formed by coating. The negative electrode of the nonaqueous-gel-electrolyte battery has a negative electrode incorporating a negative-electrode collector on which an active material layer of the negative electrode is formed by coating. Moreover, a gel layer containing an electrolyte is held between the active material layer of the positive electrode and the active material layer of the negative electrode.

The gel layer containing the electrolyte of the nonaqueous-gel-electrolyte battery has a structure that the electrolytic solution is held in the gel matrix. It leads to a fact that the nonaqueous-gel-electrolyte battery does not suffer from the leakage of the electrolytic solution. Therefore, the hard cell is not required so that reduction in the size, weight and the thickness and improvement in the degree of freedom are permitted.

The nonaqueous-gel-electrolyte battery, which incorporates the electrolytic solution held in the gel matrix, suffers from a problem in that penetration of the electrolytic solution into the active material layers of the electrode cannot sufficiently be performed. Therefore, lithium ions cannot sufficiently be moved between the two electrodes, thus resulting in a problem to arise in that a required capacity of the battery cannot be realized.

SUMMARY OF THE INVENTION

An object of the present invention is to realize a large capacity of a nonaqueous-gel-electrolyte battery, which incorporates an active material layer of a positive electrode and an active material layer of a negative electrode on each of which a gel layer containing electrolytic solution is formed by coating and which has a structure that the gel layers each containing the electrolytic solution are laminated, by facilitating penetration of the electrolytic solution held in the gel matrix of the gel layers each containing the electrolytic solution into the active material layers of the electrodes.

The inventors of the present invention have detected a fact that penetration of the electrolytic solution into the active material layers for the electrodes is facilitated by, in sol state, coating each of the active material layers for the electrodes with the gel layer containing the electrolytic solution. Thus, the present invention has been produced.

According to the present invention, there is provided a method of manufacturing a nonaqueous-gel-electrolyte battery incorporating a positive electrode constituted by forming an active material layer of the positive electrode on a positive-electrode collector; a negative electrode constituted by forming an active material layer of the negative electrode on a negative-electrode collector; a gel electrolyte layer formed by coating the surface of the active material layer of the positive electrode and/or the surface of the active material layer of the negative electrode with a gel electrolyte composition and having a structure that the positive electrode and the negative electrode are laminated to hold the gel electrolyte layer therebetween, the method of manufacturing a nonaqueous-gel-electrolyte battery comprising the step of: forming the gel electrolyte composition into a sol form; and coating the surface of the active material layer of the positive electrode and/or the surface of the active material layer of the negative electrode with the gel electrolyte composition in the form of sol.

It is preferable that the gel electrolyte composition formed into the sol form has viscosity of 1 cp to 50 cp.

To form the gel electrolyte composition into the sol form, the gel electrolyte composition is heated or diluted with nonaqueous solvent. When dilution using the nonaqueous solvent is performed, solvent having a high boiling point and solvent having a low boiling point which are mixed with each other is employed. After the coating process has been completed, the solvent having the low boiling point is removed by vaporization.

It is effective to heat the positive electrode or the negative electrode when coating of the gel electrolyte composition formed into the sol form is performed.

When the active material layer of the positive electrode or the active material layer of the negative electrode is coated with the gel electrolyte composition formed into the sol form, penetration of the gel electrolyte, and in particular, electrolytic solution into the active material layers can be facilitated.

Other objects and advantages of the present invention will become apparent from reading the following detailed description and appended claims, and upon reference to the accompanying drawings.

BRIEF DESCRIPTION OF THE DRAWINGS

For a more complete understanding of the present invention, reference should now be made to the embodiments illustrated in greater detail in the accompanying drawings and described below by way of examples of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

A method of manufacturing a nonaqueous-gel-electrolyte battery will now be described with reference to the drawings.

Figure 1:
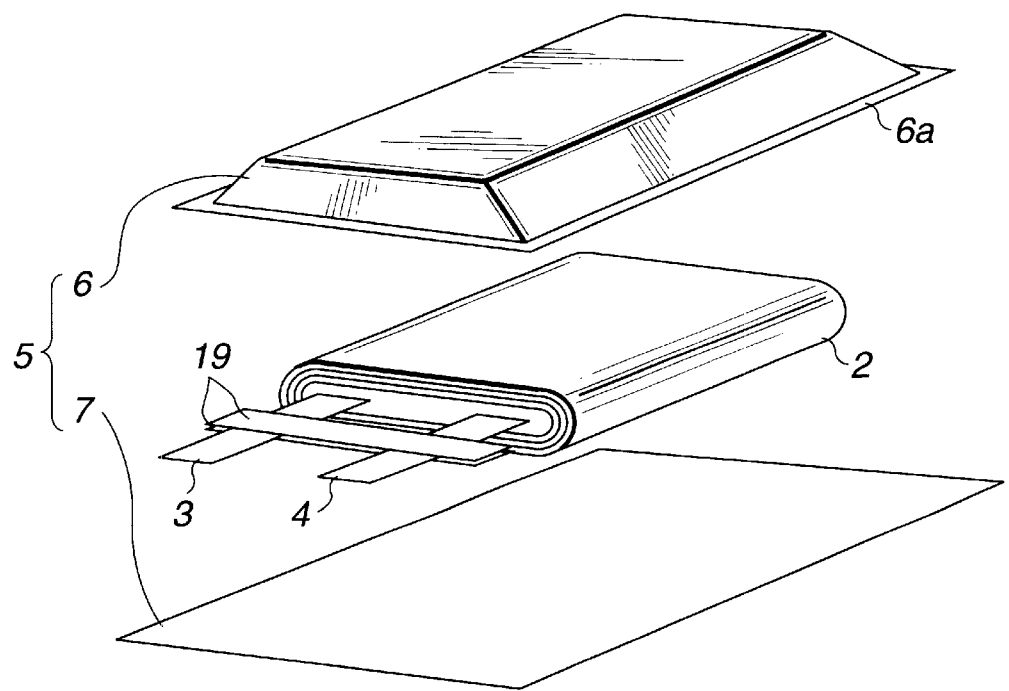
FIG. 1 is an exploded perspective view showing an example of the structure of a nonaqueous-gel-electrolyte battery.
Figure 2:
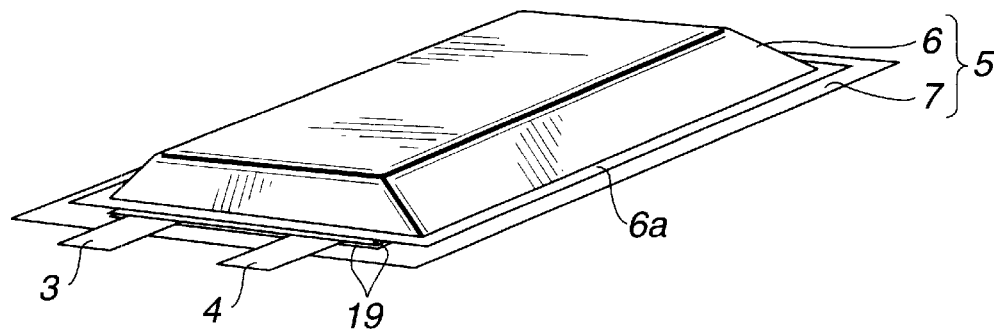
FIG. 2 is a schematic perspective view showing an example of the structure of the nonaqueous-gel-electrolyte battery.

A nonaqueous-gel-electrolyte battery 1, which must be manufactured, for, example, as shown in FIGS. 1 and 2, incorporates a positive-electrode lead wire 3 and a negative-electrode lead wire 4 connected to a wound electrode 2 and arranged to serve as terminals for establishing connection with an outer unit. The positive-electrode lead wire 3 and negative-electrode lead wire 4 are extended to the outside. The wound electrode 2 is enclosed between an upper laminate film 6 and a lower laminate film 7 which constitute a case member 5.

The wound electrode 2 is constituted by a positive electrode and a negative electrode which are laminated such that their gel electrolyte layers are disposed opposite to each other. Thus, the formed laminated is coiled many times.

The positive electrode is constituted by forming an active material layer of the positive electrode on each of two sides (or either side) of the positive-electrode collector. Moreover, the positive electrode has the gel electrolyte layer formed on the active material layer of the positive electrode formed on each of the two sides thereof.

The positive-electrode collector may be metal foil, such as aluminum foil, nickel foil or stainless steel foil. It is preferable that the metal foil is porous metal foil. When the metal foil is porous metal foil, the bonding strength between the collector and the electrode layer can be increased. The porous metal foil may be made of punching metal, expand metal or metal foil having a multiplicity of openings formed by an etching process.

To form the active material layer of the positive electrode, the active material of the positive electrode may be metal oxide, metal sulfide or specific polymer material. It is furthermore preferable that lithium composite oxide, the main component of which is $Li_xMO_2$ (M is one or more types of transition metal, preferably Co, Ni or Mn and x varies according to a state of charge/discharge of the battery and satisfying the relationship that $0.05 \leq x \leq 1.12$). It is preferable that transition metal of the lithium composite oxide is Co, Ni, Mn or the like. The foregoing lithium composite oxide is exemplified by $LiCoO_2$, $LiNiO_2$, $LiNi_yCo_{(1-y)}O_2$ (where $0<y<1$) and $LiMn_2O_4$. When the active material layer of the positive electrode is formed, the foregoing active material of the positive electrode may be employed solely or mixture of two or more types of the materials may be employed.

The lithium composite oxide can be prepared by using a raw material, such as a lithium compound and a transition metal compound, for example, carbonate, nitrate, sulfate, oxide, hydroxide, a halogen compound or the like. The lithium composite oxide can be manufactured by, for example, weighing a raw material of lithium salt and a raw material of transition metal in accordance with a required composition. Then, the foregoing raw materials are sufficiently mixed with each other. Then, the mixed materials are heated and baked at temperatures in a range from 600° C. to 1000° C. in an atmosphere in which oxygen is present. In the foregoing case, mixing is performed by a method which is not limited particularly. Powder salts in a dry state may be mixed with each other. As an alternative to this, solutions in each of which powder salt is dissolved in water may be mixed with each other.

When the positive electrode is manufactured from the foregoing active material of the positive electrode, powder of active material of the positive electrode and, if necessary, a conductive agent, such as carbon black or graphite, and binder resin, such as polyvinylidene fluoride, are uniformly mixed with one another. Then, solvent, such as dimethylformaldehyde or n-methyl pyrolidone, is added to prepare a mix composition in the form of paste for forming the positive electrode. Then, the mix composition in the form of paste is applied to the positive-electrode collector, and then the positive electrode is dried. Thus, the positive electrode for a wound cell can be manufactured.

Figure 3:
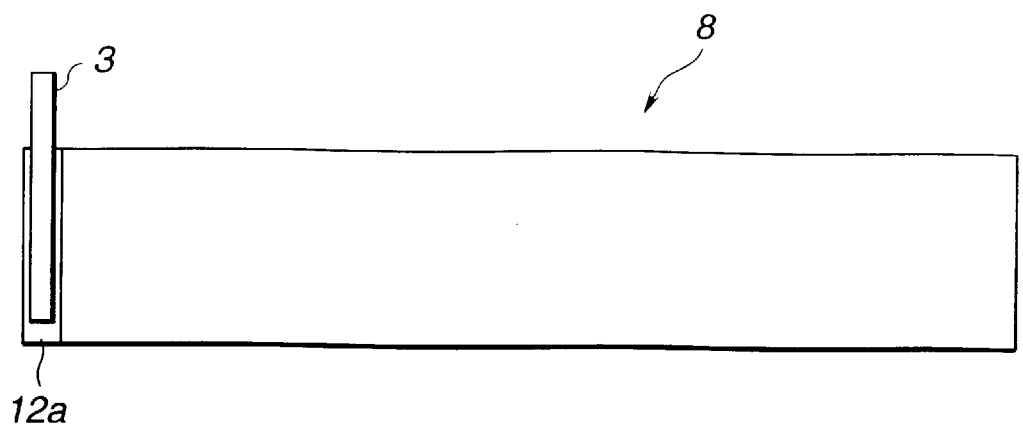
FIG. 3 is a schematic plan view showing a positive electrode.

As shown in FIG. 3, the positive electrode 8 has a positive-electrode-exploded portion 12a in which the positive-electrode collector is exposed to outside and which is formed at a lengthwise-directional end of the positive electrode to correspond to the width of the positive-electrode lead wire 3. The positive-electrode lead wire is joined to the positive-electrode-exploded portion such that the positive-electrode lead wire is extended outwards from a widthwise end of the positive-electrode-exploded portion.

The negative electrode has a structure that the active material layer of the negative electrode is formed on the two sides (or either side) of the negative-electrode collector. A gel electrolyte layer is formed on the active material layer which is formed on each of the two sides of the negative electrode.

The negative-electrode collector may be constituted by, for example, metal foil, such as copper foil, nickel foil or stainless steel foil. It is preferable that the metal foil is porous metal foil. When the metal foil is porous metal foil, the bonding strength between the collector and the electrode layer can be increased. The porous metal foil may be made of punching metal, expand metal or metal foil having a multiplicity of openings formed by an etching process.

To form the active material layer of the negative electrode, a lithium alloy, such as lithium metal or a lithium-aluminum alloy, a material, such as graphite, a non-graphitizing carbon material or a graphitizable carbon material, to which lithium can be doped/dedoped may be employed. The carbon material is exemplified by cokes (for example, pitch cokes, needle cokes, petroleum cokes or the like), graphite, vitreous carbon, a baked organic polymer compound (for example, a material obtained by baking cellulose, phenol resin, furan resin or the like at an appropriate temperature), carbon fibers, a carbonaceous material, such as active carbon, and a polymer material for the electrode, such as polyacetylene, polyaniline, polypyrrole or disulfide. When the active material layer of the negative electrode is formed, the foregoing active material of the negative electrode may be employed solely or a mixture of two more types may be employed.

When the negative electrode is manufactured from the foregoing active material of the negative electrode, the negative electrode can be manufactured by punching a plate-like lithium metal or lithium metal into a required shape. Another method may be employed with which carbon powder and binder resin, such as polyvinylidene fluoride, are uniformly mixed with each other. Then, solvent, such as dimethylformaldehyde or n-methyl pyrolidone, is added to prepare a mix composition in the form of paste for forming the negative electrode. Then, the mix composition in the form of paste is applied to the negative-electrode collector, and then the negative electrode is dried. Thus, the negative electrode for a wound cell can be manufactured.

Figure 4:
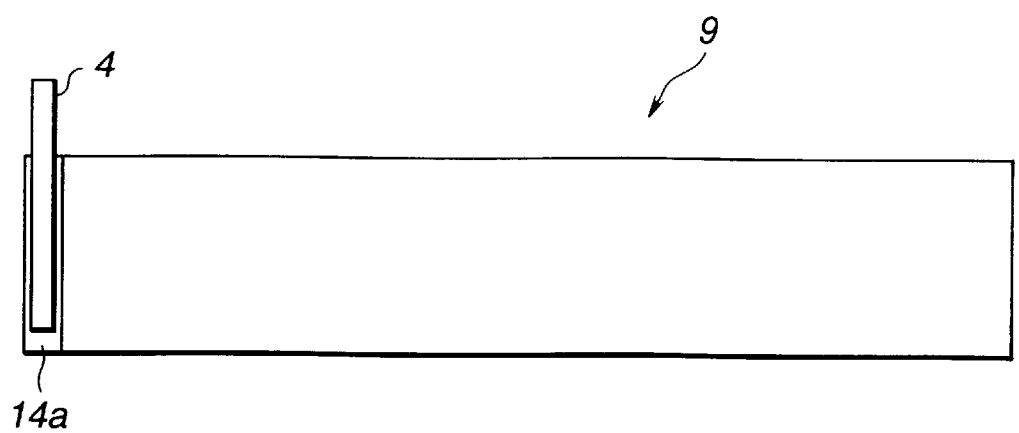
FIG. 4 is a schematic plan view showing a negative electrode.

As shown in FIG. 4, the negative electrode 9 has a negative-electrode-exploded portion 14a in which the negative-electrode collector is exposed to outside and which is formed at a lengthwise-directional end of the negative electrode to correspond to the width of the negative-electrode lead wire 4. The negative-electrode lead wire is joined to the negative-electrode-exploded portion such that the negative-electrode lead wire is extended outwards from a widthwise end of the negative-electrode-exploded portion.

Figure 5:
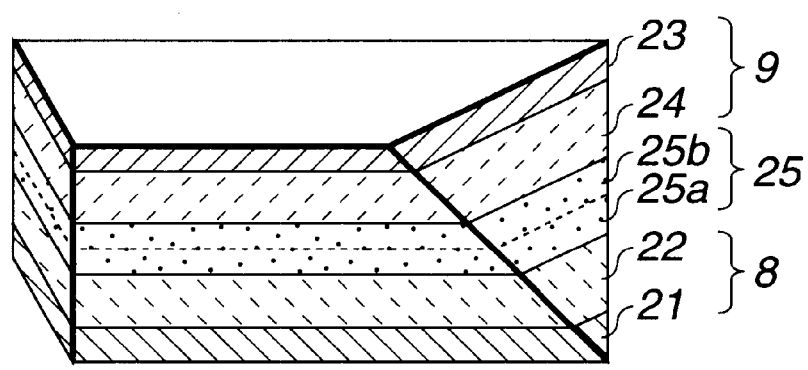
FIG. 5 is a schematic cross sectional view showing a state of lamination of the positive electrode and the negative electrode.

FIG. 5 shows the structure of the wound electrode. The wound electrode 2 incorporates a positive electrode 8 having a collector 21 of the positive electrode on which an active material layer 22 for the positive electrode is formed by coating; a negative electrode 9 having a collector 23 of the negative electrode on which an active material layer 24 of the negative electrode has been formed by coating; and a gel electrolyte layers 25 (25a and 25b) formed, by coating, on each of an active material layer 22 of the positive electrode 8 and an active material layer 24 of the negative electrode 9. The wound electrode has a structure that the gel electrolyte layers 25a and 25b each containing electrolyte adjacent to the positive electrode 8 and the negative electrode 9, respectively, are laminated.

As shown in FIG. 2, the positive-electrode lead wire 3 and the negative-electrode lead wire 4 are joined to the electrode having the structure shown in FIG. 5, as shown in FIG. 2. Then, the electrode is hermetically sealed with the upper laminate film 6 and the lower laminate film 7 so that a nonaqueous-gel-electrolyte battery is manufactured.

The wound electrode 2 may have a structure that a porous separator (for example, a film having a multiplicity of small pores and made of, for example, polyethylene or polypropylene) is interposed between the gel electrolyte layers 25a and 25b each containing electrolyte, if necessary. When the separator is provided, physical contact between the two gel electrolyte layers each containing electrolyte can completely be prevented.

The separator may be a thin film which incorporates a multiplicity of small pores and, the main composition of which is polyolefine. The material may be polypropylene, polyethylene or their composite material. It is furthermore preferable that a thin film is employed which incorporates a multiplicity of small pores and exhibits improved wettability with respect to the electrolytic solution by using a surface active agent or by performing a corona discharge process. As a result, raising of the internal resistance of the battery can be prevented.

Although the porosity of the separator is not limited, it is preferable that the porosity is 30% to 60%. The reason why the porosity is 30% or higher will now be described. If the porosity is lower than the foregoing percentage, the output characteristic of the battery deteriorates excessively. The reason why the porosity is 60% or lower will now be described. If the porosity is higher than the foregoing percentage, the mechanical strength deteriorates. The diameter of each pore and the thickness of the separator are not limited. To prevent internal short and to realize a shut-down effect by closing the pores, it is preferable that the diameter of each pore is 1 $\mu$m or smaller. The thickness of the separator may be about 5 $\mu$m to about 35 $\mu$m. When the relationship between the mechanical strength and the electric resistance of the film is considered, it is preferable that the film thickness is about 7 $\mu$m to about 20 $\mu$m.

Each of the positive-electrode lead wire 3 and the negative-electrode lead wire 4 may be made of a metal material, such as aluminum, copper, nickel or stainless steel and formed into, for example, a thin plate-like shape or a mesh shape. The positive-electrode lead wire 3 and the negative-electrode lead wire 4 are joined to the corresponding positive-electrode-exploded portion and the negative-electrode-exploded portion by a method, such as resistance welding or ultrasonic welding.

The case member 5 must have a moisture-proof characteristic. For example, a triple-layer structure formed by sequentially bonding a nylon film, aluminum foil and a polyethylene film may be employed. As shown in FIGS. 1 and 2, the case member is formed into a bulged shape to permit the upper laminate film 6 to accommodate the wound electrode 2 such that an outer end 6a which must be welded is maintained.

When the wound electrode 2 is enclosed, the upper laminate film 6 and the lower laminate film 7 of the case member 5 are placed such that their polyethylene films face each other. Then, the outer end 6a of the upper laminate film 6 and the lower laminate film 7 are bonded to each other by thermal welding. Then, the inner pressure is reduced to seal the inside portion of the case member 5. At this time, the wound electrode 2 is enclosed in the case member such that the positive-electrode lead wire 3 and the negative-electrode lead wire 4 are extended to the outside over the case member.

Note that the structure of the case member is not limited to the above-mentioned structure. For example, a bag-like laminate film may be employed to accommodate the wound electrode. In the foregoing case, the wound electrode is accommodated in the case member. Then, reduction in the pressure and sealing are performed while the negative-electrode lead wire and the positive-electrode lead wire are being extended to the outside.

When the wound electrode is enclosed in the case member, upper and lower fusible films 19 made of polyolefine resin are disposed to sandwich the positive-electrode lead wire 3 and the negative-electrode lead wire 4 at the positions of contact between the case member 5 and the positive-electrode lead wire 3 and the negative-electrode lead wire 4, as shown in FIGS. 1 and 2.

The fusible film 19 must have adhesiveness with respect to the positive-electrode lead wire and the negative-electrode lead wire. For example, the polyolefine resin is exemplified by polyethylene, polypropylene, denatured polyethylene, denatured polypropylene and their copolymers. It is preferable that the thickness of the fusible film 19 in a state in which the fusible film 19 is not welded is 20 μm to 200 μm. The reason why the thickness relationship before the thermal welding operation is 20 μm or larger will now be described. If the thickness is smaller than the foregoing value, easy handling is not permitted. The reason why the thickness relationship before the thermal welding operation is 200 μm or smaller will now be described. If the thickness is larger than the foregoing value, penetration of water is facilitated excessively to maintain airtightness in the battery.

Therefore, when the wound electrode is enclosed in the case member, the fusible films are fused owing to thermal welding. Thus, the adhesiveness among the positive-electrode lead wire, the negative-electrode lead wire and the case member can furthermore be improved.

To form the gel electrolyte layer on each of the positive electrode and the negative electrode according to the present invention, the electrolyte is dissolved in nonaqueous solvent. Then, a polymer material is added to the solution so that the gel electrolyte composition is prepared. The gel electrolyte composition is formed into the sol form which is applied to the surface of the active material layer of the positive electrode and the active material layer of the negative electrode.

The term "gel" according to the present invention is a heat reversible gel in a semi-solid form which has no fluidity and which is converted into flux solution (which is called "sol") owing to applied heat. When the solution is cooled, the heat reversible gel can be restored to the original semi-solid state.

The term "sol" according to the present invention is a heat reversible gel (a mesh shape is formed owing to crosslinking occurring due to weak secondary bonding, such as hydrogen bonding, a hydrophobic mutual action or coordinate bonding) in a state in which the secondary bond has been cut owing to heat.

To form the gel electrolyte composition into the sol form, the gel electrolyte composition is heated or diluted with nonaqueous solvent.

When dilution is performed by using the nonaqueous solvent, nonaqueous solvent having a high boiling point and a nonaqueous solvent having a low boiling point are mixed with each other. After the solution has been applied, the solvent having the low boiling point is removed by vaporizing.

Specifically, for example, electrolyte salt is dissolved in the nonaqueous solvent having the high boiling point. Then, a polymer material and the nonaqueous solvent having the low boiling point are mixed into the solution. Then, the mixture is heated so as to be formed into the sol mixture. The hot sol mixture is applied to the surfaces of the positive electrode and the negative electrode to cause a portion of the sol mixture to penetrate the active material layer of the positive electrode and the active material layer of the negative electrode. Thus, the gel electrolyte can be formed on the positive electrode and the negative electrode. The sol mixture may be prepared by dissolving electrolyte salt in nonaqueous solvent having the low boiling point and by mixing the polymer material and the nonaqueous solvent having the high boiling point. The electrolyte salt may be dissolved in mixed solvent of the nonaqueous solvent having the high boiling point and the nonaqueous solvent having the low boiling point and by mixing the polymer material into the solution. It is preferable that the heating temperature is 35° C. to 95° C., more preferably 40° C. to 85° C. If the temperature is too high, the nonaqueous solvent having the low boiling point can easily be vaporized before the solution is applied to the electrode. Thus, uniform coating cannot be performed. Moreover, a portion of the electrolytic solution is decomposed owing to heat. Thus, a required capacity of a battery cannot be obtained. If the temperature is too low, penetration of the electrolyte layer into the electrode cannot sufficiently be performed. What is worse, slow penetration of the electrode layer into the electrode causes the productivity to deteriorate excessively.

It is preferable that the viscosity of the sol mixture, which must be applied to the electrode, is 1 cp to 50 cp, more preferably 1 cp to 20 cp. If the viscosity is too high, penetration of the electrolyte layer into the electrode cannot sufficiently be performed. If the viscosity is too low, uniform coating cannot be performed.

After the sol mixture has been applied, it is preferable that the solvent having the low boiling point is positively removed by drying. The drying temperature for removing the nonaqueous solvent having the low boiling point is not limited if the temperature is not higher than the boiling point of the nonaqueous solvent having the high boiling point.

To form the gel electrolyte layer, any one of the following materials may be employed as the nonaqueous solvent having the high boiling point: ethylene carbonate, polypropylene carbonate, butylene carbonate, γ-butyrolactone, 2,4-difluoroanisole, 2,6-difluoroanisole and 4-bromoveratrole. The nonaqueous solvent having the low boiling point may be, for example, γ-valerolactone, diethoxyethane, tetrahydrofuran, 2-methyltetrahydrofuran, 1,3-dioxane, methyl acetate, methyl polypropylene oxide, dimethyl carbonate, diethyl carbonate or ethylmethyl carbonate.

It is preferable that the nonaqueous solvent having the low boiling point is nonaqueous solvent having a boiling point of 110° C. or lower at the normal pressure. When the gel electrolyte composition is applied to the surface and then only the nonaqueous solvent having the low boiling point is removed by drying, nonaqueous solvent having a boiling point higher than 110° C. encounters excessive rise in the drying temperature. In the foregoing case, the electrolyte salt contained in the gel electrolyte composition is undesirably decomposed with heat.

The nonaqueous solvent having the high boiling point is selected to be combined with the nonaqueous solvent having the low boiling point. It is preferable that the nonaqueous solvent having the high boiling point has a boiling point which is higher than that of the nonaqueous solvent having the low boiling point realized at the normal pressure by 50° C. or larger. If the difference in the boiling point is smaller than 50° C., a portion of the nonaqueous solvent having the high boiling point is undesirably removed when the non-aqueous solvent having the low boiling point is removed by drying.

When the gel electrolyte layer is formed, the electrolyte salt may be lithium salt, such as $LiP_6$, $LiAsF_6$, $LiBF_4$, $LiClO_4$, $LiCF_3SO_3$, $Li(CF_3SO_2)_2N$ or $LiC_4F_9SO$. The lithium salt may be employed solely or mixture of two or more lithium salts may be employed. It is preferable that the quantity of the electrolyte salt which must be added is determined in such a manner that the molar concentration of the electrolyte salt in the nonaqueous electrolytic solution in the gel electrolyte is 0.10 mol/l to 2.0 mol/l to obtain satisfactory ion conductivity.

To form the gel electrolyte layer, the polymer material for use in the gel electrolyte may polyvinylidene fluoride or copolymer of polyvinylidene fluoride. The copolymer monomer is exemplified by hexafluoropropylene or tetrafluoroethylene.

The polymer material for use in the gel electrolyte may be polyacrylonitrile or copolymer of polyacrylonitrile. The copolymer monomer (vinyl monomer) may be vinyl acetate, methyl methacrylate, butyl hydroxide, methyl acrylate, butyl acrylate, itaconic acid, methyl hydride acrylate, ethyl hydride acrylate, acrylic amid, vinyl chloride, vinylidene fluoride or vinylidene chloride. Also the following materials may be employed: acrylonitrile butadiene rubber, acrylonitrile butadiene styrene resin, acrylonitrile polyethylene propylene diene styrene chloride resin, acrylonitrile vinyl chloride resin, acrylonitrile methaacrylate resin or acrylonitrile methaacrylate resin.

The polymer material for use in the gel electrolyte may be polyethylene oxide or copolymer of polyethylene oxide. The copolymer monomer is exemplified by polypropylene oxide, methyl methacrylate, butyl methacrylate, methyl acrylate and butyl acrylate.

As the polymer material for use in the gel electrolyte, polyether denatured siloxane or its copolymer may be employed.

The foregoing polymer material for use in the gel electrolyte may be employed solely or mixture of two or more types may be employed.

To improve the quality of the gel electrolyte in the gel electrolyte layer, it is preferable that the quantity of the polymer material, which must be added, is, for example, about 5% to 25% with respect to the weight of the gel electrolyte layer, more preferably 8% to 20%. It is preferable that the ratio of the nonaqueous solvent having the low boiling point with respect to the nonaqueous solvent having the high boiling point is about 1 to 3, more preferably 1.2 to 2. If the quantity of the added polymer material is too small, the nonaqueous solvent in the gel electrolyte layer cannot sufficiently be maintained. If the quantity of the added polymer material is too large, satisfactory penetration of the nonaqueous solvent and the electrolyte salt from the gel electrolyte layer to the electrode cannot be performed. If the ratio of the nonaqueous solvent having the low boiling point with respect to the nonaqueous solvent having the high boiling point is too low, also penetration of the nonaqueous solvent and the electrolyte salt from the gel electrolyte layer to the electrode cannot satisfactorily be performed. If the ratio of the nonaqueous solvent having the low boiling point with respect to the nonaqueous solvent having the high boiling point is too high, also the nonaqueous solvent having the high boiling point is undesirably simultaneously be dried when the nonaqueous solvent having the low boiling point is dried. When the gel electrolyte layer is formed, it is effective to form the gel electrolyte composition into the sol form and to heat the positive electrode or the negative electrode, which is coated with the sol gel electrolyte composition, to a temperature higher than the normal temperature.

If the temperature of the positive electrode and that of the negative electrode are raised excessively, the capacity of the battery is reduced. Therefore, it is preferable that the heating temperature of each of the positive electrode and the negative electrode is 35° C. to 150° C., more preferably 50° C. to 120° C.

A method of forming the gel electrolyte layer while the positive electrode or the negative electrode is being heated will now be described.

As described above, the structure (the material, the structure of the battery and the like) of the nonaqueous-gel-electrolyte battery is similar to that of a conventional nonaqueous-gel-electrolyte battery except for the gel layer containing the electrolytic solution which is applied to each of the positive electrode and the negative electrode, as described above.

As the positive electrode, dispersant is prepared in which lithium composite oxide (active material of the positive electrode) expressed by general formula $LiM_xO_y$ (M, x and y are metal, the composition ratio of metal and the composition ratio of oxygen) and a conductive agent, such as acetylene black, are dispersed in solvent together with a binder, such as polyvinylidene fluoride. The positive-electrode collector, such as aluminum foil, is coated with the dispersant to form a thin film, and then the positive-electrode collector is dried so that the active material layer of the positive electrode is formed.

The active material layer of the positive electrode may be formed on either side or two sides of the positive-electrode collector. To obtain a required density of the active material layer of the positive electrode, a pressing operation may be performed, if necessary.

As the negative electrode, dispersant is prepared in which the carbon material which occludes lithium ions (for example, carbon powder having a low degree of crystallization or graphite powder having a high degree of crystallization) is dispersed in solvent together with a binder, such as polyvinylidene fluoride. Then, the active material of the negative electrode is formed by coating the negative-electrode collector, such as copper foil, with the dispersant and by drying the negative-electrode collector.

The active material layer of the negative electrode may be formed on either side or two sides of the negative-electrode collector. To realize a required density of the active material layer of the negative electrode, a pressing process may be performed, if necessary.

The gel layer containing the electrolytic solution is obtained by forming, into a film, a composition for forming the gel layer containing electrolytic solution composed of resin with which gel matrices can be formed, solvent for swelling the foregoing resin and electrolyte.

In general, the gel layer containing the electrolytic solution is formed by coating such that heating and fluidizing process is performed because the composition for forming the gel layer containing the electrolyte in the form of a jelly shape at room temperatures has poor fluidity. To enhance penetration of the gel into the electrode (that is, penetration of the electrolytic solution into the active material layer of the electrode) at this time, solvent having a boiling point lower than that of the solvent for dissolving the electrolyte may be employed as diluting solvent.

The temperature to which the composition for forming the gel layer containing the electrolytic solution is heated when the gel layer containing the electrolytic solution is formed by coating is a temperature not lower than the temperature at which the composition is fluidized. Moreover, the foregoing temperature is lower than the boiling point of the solvent having the lowest boiling point among the solvents contained in the composition.

As the resin for use in the composition for forming the gel layer containing the electrolytic solution, polyvinylidene fluoride, hexafluoropropylene-vinylidene fluoride copolymer or polyacrylonitrile may be employed.

As the solvent, γ-butylolactone, ethylene carbonate, polypropylene carbonate, dimethyl carbonate, diethyl carbonate or ethylmethyl carbonate may be employed.

As the electrolyte, lithium salt, such as lithium phosphate hexafluoride, lithium perchlorate or tetrafluoride lithium borate, may be employed.

To manufacture the foregoing battery, the positive electrode is manufactured by forming the active material layer of the positive electrode on the positive-electrode collector by coating.

Then, while the positive electrode is being heated to a temperature higher than the room temperature, the gel lithium containing the electrolyte is, by coating, formed on the active material layer of the positive electrode.

Figure 6:
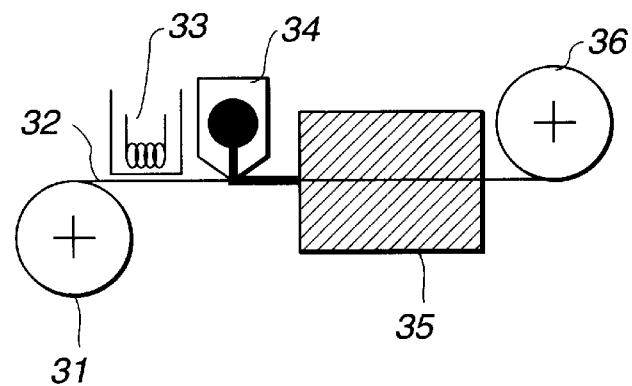
FIG. 6 is a schematic view showing the structure of an apparatus for sequentially coating one side for use when the nonaqueous-gel-electrolyte battery is manufactured.

The gel layer containing the electrolytic solution can be formed by coating either side or by sequentially coating two sides by an apparatus for sequentially coating one side structured as shown in FIG. 6. That is, an electrode 32 unwounded from an unwinding roll 31 is heated by an apparatus 33 for previously heating an electrode. Thus, the active material layer of the electrode formed on either side of the electrode 32 is coated with the composition for forming the gel layer containing the electrolytic solution by a coater head 34. The applied composition for forming the gel layer containing the electrolytic solution is dried when it is allowed to pass through a drier 35 so as to be formed into the gel layer containing the electrolytic solution. The electrode 32 on which the gel layer containing the electrolytic solution is wound around a winding roll 36.

Figure 7:
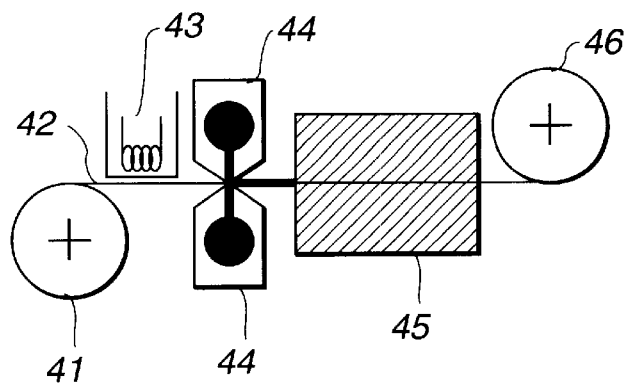
FIG. 7 is a schematic view showing the structure of an apparatus for sequentially coating two sides for use when the nonaqueous-gel-electrolyte battery is manufactured.

The gel layer containing the electrolytic solution may be formed by coating by an apparatus for simultaneously coating two sides structured as shown in FIG. 7. That is, an electrode 42 unwounded from an unwinding roll 41 is heated by an apparatus 43 for previously heating an electrode. Thus, the two active material layers of the electrode are simultaneously coated with the compositions of for forming the gel layer containing the electrolytic solution by a coater head 44. The composition for forming the gel layer containing the electrolytic solution is dried when it is allowed to pass through a drier 45 so as to be formed into the gel layer containing the electrolytic solution. The electrode 42 having the gel layers each containing the electrolytic solution is wound around a winding roll 46.

When a pressing operation is required, a usual press roll apparatus may be used to perform the pressing operation after the active material layer of the electrode has been formed and before the gel layer containing the electrolytic solution is formed.

Similarly to the process for manufacturing the positive electrode, the active material layer of the negative electrode is formed on the negative-electrode collector by coating so that the negative electrode is manufactured. Then, while the negative electrode is being heated to a temperature higher than the room temperature, the gel layer containing the electrolytic solution is formed on the active material layer of the negative electrode by coating.

The gel layers each containing the electrolytic solution for the positive electrode and the negative electrode are laminated. Thus, an electrode structured as shown in FIG. 5 can be obtained.

To manufacture the battery from the obtained electrode, integration is performed by a method with which the electrode coated with the gel layer containing the electrolytic solution is silted to perform integration or a method with which the electrode is silted and the gel layer containing the electrolytic solution is formed by coating to perform integration. As an alternative to this, a method may be employed which is combination of the two methods such that either electrode is silted after it has been coated with the gel layer containing the electrolytic solution. Moreover, another electrode is silted, and then it is coated with the gel layer containing the electrolytic solution. Thus, the integration is performed. Another method may be employed with which the gel layer containing the electrolytic solution is formed on only either side of the electrode by coating. Then, the gel layer containing the electrolytic solution is formed on another side of the electrode, and then integration is performed.

The battery device is manufactured such that the lead wire are welded to the portions of the collectors on each of which the active material layer of the electrode is not formed by coating. Then, the electrode devices are laminated such that the electrode layers of the two electrodes are disposed opposite to each other. The lamination may be performed by laminating the electrodes cut to have a required size or by winding the laminated electrodes.

The thus-manufactured battery device is sandwiched between laminate films, and then pressed to improve adhesiveness of the gel layer containing the electrolytic solution of each of the two electrode. Then, sealing is performed to prevent contact of the battery device with the air. Thus, a battery as shown in FIG. 2 can be obtained.

As the foregoing laminate film, for example, a laminate film formed by evaporating aluminum may be employed.

The electrode is previously heated before the composition for forming the gel layer containing the electrolytic solution is applied by a method which is not limited particularly. The following methods may be employed: a method with which the electrode is allowed to pass through a roll, the temperature of which has been adjusted, a method with which air, the temperature of which has been adjusted, is supplied or a method using an infrared lamp.

Examples of the present invention will now be described by describing results of examples.

Note that expression "parts" is "parts by weight" unless otherwise specified.

EXAMPLE 1

In this example, the positive electrode was manufactured such that 91 wt % of $LiCoO_2$ having an average particle size of 5 µm, 6 wt % of carbon black serving as a conductive agent and 3 wt % of polyvinylidene fluoride were mixed so that a mix for the positive electrode was prepared. The mix for the positive electrode was dispersed in n-methyl pyrolidone so as to be slurried (formed into paste).

Then, the obtained slurry mix for the positive electrode was uniformly applied to two sides of aluminum foil to be formed into the positive-electrode collector and having a thickness of 20 µm. Then, the two sides were dried, then a roller pressing machine was operated to compress-mold the aluminum foil so that an elongated positive electrode was manufactured.

The negative electrode was manufactured such that 90 wt % of graphite having an average particle size of 20 µm and 10 wt % of polyvinylidene fluoride serving as a binding agent were mixed so that a mix for the negative electrode was prepared. The mix for the negative electrode was dispersed in n-methyl pyrolidone so as to be slurried (formed into paste).

Then, the obtained slurry mix for the negative electrode was uniformly applied to two sides of copper foil to be formed into the negative-electrode collector and having a thickness of 15 µm. Then, the two sides were dried, then a roller pressing machine was operated to compress-mold the copper foil so that an elongated negative electrode was manufactured.

A positive-electrode lead wire constituted by mesh-shape aluminum was spot-welded to the positive electrode, while negative-electrode lead wire constituted by mesh-shape copper was spot-welded to the negative electrode. Thus, the terminals for establishing the connection with outside were formed.

To form the gel electrolyte layer, $LiPF_6$ was dissolved in mixed solvent in which ethylene carbonate, polypropylene carbonate and γ-butylolactone were mixed at weight ratios 4:3:3 in such a manner that the concentration was made to be 1.2 mol/l. Obtained mixed solution (A), dimethyl carbonate (B) and copolymer (C) of vinylidene fluoride and hexafluoropropylene were mixed with one another such that the weight ratio B/A. was 1.8 and the weight ratio C/A was 15%. Then, the mixed solution was uniformly dispersed by a homogenizer, and then the solution was stirred while the solution was being heated to 75° C. When the mixed solution was changed to a colorless and transparent state, the stirring operation was completed. Thus, a mixed material in the form of sol was obtained. In a state where the sol material was heated to 75° C., a doctor blade was used to uniformly coat the two sides of each of the positive electrode and the negative electrode with the mixed material in the form of sol. Then, dimethyl carbonate was removed by drying so that the gel electrolyte layer was formed on the surface of each of the positive electrode and the negative electrode. Note that the viscosity of the mixed material in the form of sol was 7 cp.

The thus-manufactured negative electrode and the positive electrode were laminated through a thin film (trade name CELLGUARD 3501 manufactured by Separation Products Japan) which had a multiplicity of small pores, which was made of polypropylene and which served as a separator. The laminate was wound many times so that a wound electrode was manufactured. The thus-obtained wound electrode was enclosed in a laminate film, the inside portion of which was reduced, while the negative-electrode lead wire and the positive-electrode lead wire were being caused to extend to the outside. As a result, a nonaqueous-gel-electrolyte battery having a thickness of 3.7 mm was manufactured.

EXAMPLES 2 TO 9

Nonaqueouss-gel-electrolyte batteries according to Examples 2 to 9 were manufactured similarly to Example 1 except for the temperatures at which heating, stirring and coating were performed to form the gel electrolyte layer and the viscosity at the time of performing coating which were changed as shown in Table 1.

TABLE 1

| Example | Composition of Mixed Sol Solution | Stirring and Coating Temperature | Viscosity at Coating |
| --- | --- | --- | --- |
| 2 | same as Example 1 | 85° C. | 5 cp |
| 3 | same as Example 1 | 90° C. | 4 cp |
| 4 | same as Example 1 | 95° C. | 2 cp |
| 5 | same as Example 1 | 97° C. | 1 cp |
| 6 | same as Example 1 | 60° C. | 15 cp |
| 7 | same as Example 1 | 40° C. | 30 cp |
| 8 | same as Example 1 | 35° C. | 50 cp |
| 9 | same as Example 1 | 32° C. | 60 cp |

EXAMPLES 10 TO 26

Nonaqueous-gel-electrolyte batteries according to Examples 10 to 26 were manufactured similarly to Example 1 except for the weight ratio B/A and the weight ratio C/A which were changed as shown in Table 2 when the gel electrolyte layers were formed.

TABLE 2

| Example | B/A | C/A | Steering and Coating Temperature | Viscosity at Coating |
| --- | --- | --- | --- | --- |
| 10 | 1.5 | 15% | 75° C. | 15 cp |
| 11 | 1.2 | 15% | 75° C. | 20 cp |
| 12 | 1.0 | 15% | 75° C. | 30 cp |
| 13 | 0.9 | 15% | 75° C. | 40 cp |
| 14 | 2.0 | 15% | 75° C. | 10 cp |
| 15 | 2.5 | 15% | 75° C. | 8 cp |
| 16 | 3.0 | 15% | 75° C. | 5 cp |
| 17 | 3.2 | 15% | 75° C. | 2 cp |
| 18 | 1.8 | 10% | 75° C. | 10 cp |
| 19 | 1.8 | 8% | 75° C. | 8 cp |
| 20 | 1.8 | 5% | 75° C. | 5 cp |
| 21 | 1.8 | 4% | 75° C. | 2 cp |
| 22 | 1.8 | 18% | 75° C. | 18 cp |
| 23 | 1.8 | 20% | 75° C. | 20 cp |
| 24 | 1.8 | 22% | 75° C. | 25 cp |
| 25 | 1.8 | 25% | 75° C. | 30 cp |
| 26 | 1.8 | 27% | 75° C. | 40 cp |

The amount of swell of each of the manufactured nonaqueous-gel-electrolyte batteries in a direction of the thickness of each battery occurring when charging for activation was performed and a capacity when 0.2 C discharge was performed were measured. Results were shown in Table 3. The discharge capacities were shown as relative ratios when the discharge capacity of the battery according to Example 1 was 100.

TABLE 3

| Example | Amount of Swell at Charge for Activation (mm) | Discharge Capacity Ratio |
| --- | --- | --- |
| 1 | 0 | 100 |
| 2 | 0 | 100 |
| 3 | 0.1 | 98 |
| 4 | 0.15 | 95 |
| 5 | 0.8 | 82 |
| 6 | 0 | 98 |
| 7 | 0 | 96 |
| 8 | 0 | 93 |
| 9 | 0 | 80 |
| 10 | 0 | 100 |
| 11 | 0 | 96 |
| 12 | 0 | 93 |
| 13 | 0 | 85 |
| 14 | 0 | 98 |
| 15 | 0 | 95 |
| 16 | 0 | 92 |
| 17 | 0 | 83 |
| 18 | 0 | 100 |
| 19 | 0.1 | 98 |
| 20 | 0.15 | 95 |
| 21 | 0.8 | 82 |
| 22 | 0 | 98 |
| 23 | 0 | 96 |
| 24 | 0 | 94 |
| 25 | 0 | 92 |
| 26 | 0 | 81 |

As can be understood from the foregoing results, the nonaqueous-gel-electrolyte batteries which satisfied the conditions according to the present invention were free from excessive swell in the direction of the thickness. Thus, satisfactorily large discharge capacities were realized.

EXAMPLES 27 to 34

Manufacture of Positive Electrode

Suspension of a composition of an active material layer for the positive electrode as shown in Table 4 was mixed by a disperser for four hours. Then, the solution was pattern-applied to the two sides of aluminum foil having a thickness of 20 μm by an apparatus shown in FIG. 6. The coating pattern was such that a region having a length of 160 mm was coated and a region having a length of 30 mm was free from coating. The foregoing pattern was repeated. The positions at which coating was started and the positions at which coating was completed were made coincide with each other between the two sides.

TABLE 4

| Composition of Active Material Layer of Positive Electrode | Parts |
| --- | --- |
| LiCoO$_2$ (average particle size: 10 μm) | 100 |
| polyvinylidene Fluoride (average molecular weight: 300,000) | 5 |
| carbon black (average particle size: 15 nm) | 10 |
| N-methyl-2-pyrolidone | 100 |

The raw material member for the positive electrode was pressed under a linear pressure of 300 kg/cm. The thickness of the positive electrode and the density of the active material layer of the positive electrode were 100 μm and 3.45 g/cc after the pressing operation.

Manufacture of Negative Electrode

Suspension of a composition of an active material layer for the negative electrode as shown in Table 5 was mixed by a disperser for four hours. Then, the solution was pattern-applied to the two sides of copper foil having a thickness of 10 μm by an apparatus shown in FIG. 6. The coating pattern was such that a region having a length of 160 mm was coated and a region having a length of 30 mm was free from coating. The foregoing pattern was repeated.

TABLE 5

| Composition of Active Material Layer of Negative Electrode | Parts |
| --- | --- |
| artificial graphite (average particle size: 20 μm) | 100 |
| polyvinylidene fluoride (average molecular weight: 300,000) | 15 |
| N-methyl-2-pyrolidone | 200 |

The raw material member for the negative electrode was pressed under a linear pressure of 300 kg/cm. The thickness of the negative electrode and the density of the active material layer of the negative electrode were 50 μm and 1.30 g/cc, respectively, after the pressing operation.

Forming of Gel Layer Containing Electrolytic Solution by Coating

A composition for forming the gel layer containing the electrolytic solution shown in Table 6 was mixed by a disperser for one hour in a state where the foregoing composition was heated at 70° C. The active material layer of the negative electrode formed on either side of the negative electrode was pattern-coated to make the thickness to be 20 μm by the apparatus shown in FIG. 6. The surface of the active material layer of the positive electrode formed on each of the two sides of the positive electrode was pattern-coated by an apparatus shown in FIG. 7 to make the thickness to be 20 μm. At this time, the drier was adjusted in such a manner that substantially only dimethyl carbonate was evaporated.

Note that the positive electrode and the negative electrode were heated to temperatures shown in Table 7 when the gel layer containing the electrolytic solution was formed by coating by adjusting the apparatus for previously heating the electrode to a predetermined temperature.

Then, the raw material member for the negative electrode coated with the gel layer containing the electrolytic solution was cut into pieces each having a width of 40 mm so that an elongated electrode in the form of a pan cake was manufactured. The raw material member for the positive electrode was cut into pieces each having a width of 38 mm so that an elongated electrode in the form of a pan cake was manufactured.

TABLE 6

| Composition for Forming Gel Layer Containing Electrolytic Solution | |
| --- | --- |
| poly (hexafluoropropylene-vinylidene fluoride) copolymer*1 | 5 parts |
| dimethyl carbonate (DMC) | 75 parts |

TABLE 6-continued

Composition for Forming Gel Layer Containing Electrolytic Solution

| | |
|---|---|
| Electrolytic Solution (LiPF$_6$: 1.2 mol/litter)*2 | 20 parts |

*1 quantity of contained hexafluoropropylene = 6 parts
*2 solvent for electrolytic solution: ethylene carbonate (EC)/propylene carbonate (PC)/γ-butyrolactone (GBL) = 4/3/3

Manufacture of Battery

Then, lead wires were welded to the positive and negative electrodes. Then, the positive electrode and the negative electrode were bonded to each other such that their active material layers of the electrodes were disposed opposite to each other. Then, the two electrodes were pressed against each other so as to be sent to the integrating portion. Thus, a battery device was formed. The battery device was sandwiched such that a laminate film covered the battery device. Then, the film was welded so that a battery structured as shown in FIG. 2 was manufactured.

Evaluation

The manufactured batteries were measured and evaluated as follows. Obtained results were shown in Table 7.

Temperature of Electrode When Gel Layer Containing Electrolytic Solution was Temperature of Electrode When Gel Layer Containing Electrolytic Solution was Coated The temperature of the surface (the active material layer of the electrode) of the electrode immediately before the gel layer containing the electrolytic solution was coated was measured by an infrared thermometer (thermometer 505 manufactured by Minolta, Emissivity=0.80).

Penetration of Electrolytic Solution Into Active Material Layer Into Electrolytic Solution The active material layer of the electrode was separated from the collector. Then, the collector (material of which must be analyzed=phosphorus caused from the electrolyte) by EDX-EPMA (which is known as XMA and model number: XL-30FEG (SEM portion) manufactured by Philips+EDAX·DX4$i$ (XMA portion) manufactured by Philips).

Evaluation of Capacity of Battery

The batteries were allowed to stand in a usual environment (25° C. and 60 RH %) for 12 hours. Then, each battery was charged with a constant current of 50 mA, and then the battery was charged for one hour under a condition of constant voltage of 4.2 V. The charge was performed to 3.0 V cut with an electric current of 50 mA to obtain the capacity of the battery. Then, a ratio with respect to the designed capacity was calculated.

TABLE 7

| Example | Temperature of Apparatus for Previously Heating Electrode (° C.) | Temperature of Electrode (° C.) | | Penetration | Capacity Ratio (%) |
|---|---|---|---|---|---|
| | | Positive Electrode | Negative Electrode | | |
| 27 | — | 23 | 23 | not occurred | 85 |
| 28 | 30 | 30 | 30 | not occurred | 95 |
| 29 | 40 | 39 | 39 | occurred | 97 |
| 30 | 60 | 58 | 58 | occurred | 99 |
| 32 | 90 | 87 | 87 | occurred | 100 |
| 33 | 120 | 115 | 114 | occurred | 99 |
| 34 | 150 | 143 | 142 | occurred | 97 |
| 35 | 180 | 170 | 169 | occurred | 93 |

As shown in Table 7, when the temperature of the electrode (the active material layer of the electrode) immediately before the gel layer containing the electrolytic solution was applied was lower than the room temperature, the electrolytic solution did not penetrate the active material layer of the electrode. As a result, satisfactory characteristics of the battery were not obtained.

If the temperature of the active material layer of the electrode was too high, penetration of the electrolytic solution into the active material layer of the electrode was confirmed. However, satisfactory characteristics of the battery were not exhibited. Although the reason for this is unclear, the causes are considered that LiPF$_6$ which is the electrolyte is decomposed owing to heat or solvent component of the electrolytic solution was evaporated.

Therefore, the preferred range of the temperatures at which the electrode immediately before the gel layer containing the electrolytic solution is coated is previously heated is 35° C. to 150° C., more preferably 50° C. to 120° C.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A method of manufacturing an electrolytic battery, comprising:
    (a) dissolving an electrolyte salt in a non-aqueous solvent;
    (b) adding a polymer material to the dissolved electrolyte salt-non-aqueous solvent to generate a gel forming electrolyte composition, and then heating between 35 to 95° C.;
    (c) forming the gel forming electrolyte composition into a sol form;
    (d) applying the sol form to a surface of a positive electrode active material layer and to a surface of a negative electrode active material layer; and
    (e) placing a porous separator between the positive and negative active material layers, the porous separator having a porosity between 30% and 60%.

2. The method of claim 1, wherein the method further comprises laminating the positive electrode active material layer and the negative electrode active material layer to hold the sol form therebetween.

3. The method of claim 1, wherein the method further comprises forming the sol form to have a viscosity between 1 cp to 50 cp.

4. The method of claim 1, wherein the method of forming the gel forming electrolyte composition further comprises diluting the gel forming electrolyte composition into a mixture of a high-boiling-point non aqueous solvent and a low-boiling-point non aqueous solvent.

5. The method of claim 4, wherein the method further comprising vaporizing the low boiling point solvent.

6. The method of claim 4, wherein the method of adding the polymer material further comprises adding a quantity of polymer material that ranges from 5 wt % to 25 wt % relative to the high boiling point non aqueous solvent.

7. The method of claim 4, wherein the method of diluting further comprises selecting a high boiling point non aqueous solvent comprising at least one of an ethylene carbonate, polypropylene carbonate, butylene carbonate, gamma butyrolactone, 2,4-difluoroanisole, 2,6-difluoroanisole, and 4-bromoveratrole.

8. The method of claim 4, wherein the method of diluting further comprises selecting a low boiling point non aqueous solvent comprising at least one of a gamma valerolactone, diethoxyethane, tetrahydranofuran, 2-methyltetrahydranofuran, 1,3-dioxane, methyl acetate, methyl polypropylene oxide, dimethyl carbonate, and ethylmethyl carbonate.

9. The method of claim 4, wherein the method of diluting further includes selecting the low boiling point solvent that has a boiling point less than 110 deg. C.

10. The method of claim 1, wherein the method further comprises:
(f) selecting a high boiling point non aqueous solvent comprising at least one of an ethylene carbonate, polypropylene carbonate, butylene carbonate, gamma butyrolactone, 2,4-difluoroanisole, 2,6-difluoroanisole, and 4-bromoveratrole;
(g) selecting a low boiling point non aqueous solvent comprising at least one of a gamma valerolactone, diethoxyethane, tetrahydranofuran, 2-methyltetrahydranofuran, 1,3-dioxane, methyl acetate, methyl polypropylene oxide, dimethyl carbonate, and ethylmethyl carbonate;
(h) selecting the low boiling point solvent that has a boiling point less than 110 deg. C.;
(i) diluting the gel forming electrolyte composition into a mixture of the high-boiling-point non aqueous solvent and the low-boiling-point non aqueous solvent;
(j) adding a quantity of polymer material that ranges from 5 wt % to 25 wt % relative to the diluted gel forming electrolyte composition-solvent mixture to form a sol form;
(k) vaporizing the low boiling point solvent;
(l) forming the sol form to have a viscosity between 1 cp to 50 cp; and
(m) laminating the positive electrode active material layer and the negative electrode active material layer to hold the sol form therebetween.

11. A method of manufacturing an electrolytic battery, comprising:
(a) mixing a high boiling point non aqueous solvent with a low boiling point non aqueous solvent;
(b) mixing an electrolyte salt into the solvent mixture;
(c) mixing a polymer material to the electrolyte salt—solvent mixture; and
(d) heating the polymer material mixture at 35 to 95° C. to form a sol form; and (e) forming the sol form to have a viscosity between 1 cp to 50 cp.

12. The method of claim 11, wherein the method further comprises laminating a positive electrode active material layer and a negative electrode active material layer to hold the sol form therebetween.

13. The method of claim 11, wherein the method further comprising vaporizing the low boiling point solvent.

14. The method of claim 13, wherein the method of mixing the polymer material further comprises adding a quantity of polymer material that ranges from 5 wt % to 25 wt % relative to the high boiling point non aqueous solvent.

15. The method of claim 11, wherein the method of diluting further comprises selecting a the high boiling point non aqueous solvent comprising at least one of a ethylene carbonate, polypropylene carbonate, butylene carbonate, gamma butyrolactone, 2,4-difluoroanisole, 2,6-difluoroanisole, and 4-bromoveratrole.

16. The method of claim 11, wherein the method of diluting further comprises selecting a the low boiling point non aqueous solvent comprising at least one of a gamma valerolactone, diethoxyethane, tetrahydranofuran, 2-methyltetrahydranofuran, 1,3-dioxane, methyl acetate, methyl polypropylene oxide, dimethyl carbonate, and ethylmethyl carbonate.

17. The method of claim 11, wherein the method of diluting further includes selecting the low boiling point solvent that has a boiling point less than 110 deg. C.

18. The method of claim 11, wherein the method further comprises:
(e) laminating a positive electrode active material layer and a negative electrode active material layer to hold the sol form therebetween;
(f) forming the sol form to have a viscosity between 1 cp to 50 cp;
(g) vaporizing the low boiling point solvent;
(h) adding a quantity of polymer material that ranges from 5 wt % to 25 wt % relative to the high boiling point non aqueous solvent;
(i) selecting a the high boiling point non aqueous solvent comprising at least one of a ethylene carbonate, polypropylene carbonate, butylene carbonate, gamma butyrolactone, 2,4-difluoroanisole, 2,6-difluoroanisole, and 4-bromoveratrole;
(j) selecting a the low boiling point non aqueous solvent comprising at least one of a gamma valerolactone, diethoxyethane, tetrahydranofuran, 2-methyltetrahydranofuran, 1,3-dioxane, methyl acetate, methyl polypropylene oxide, dimethyl carbonate, and ethylmethyl carbonate; and
(k) selecting the low boiling point solvent that has a boiling point less than 110 deg. C.

19. A method of manufacturing an electrolyte battery, consisting of the following steps in order:
(a) selecting a high boiling point non aqueous solvent comprising at least one of an ethylene carbonate, polypropylene carbonate, butylene carbonate, gamma butyrolactone, 2,4-difluoroanisole, 2,6-difluoroanisole, and 4-bromoveratrole;
(b) adding a quantity of polymer material that ranges from 5 wt % to 25 wt % relative to the high boiling point non aqueous solvent to generate a gel forming electrolyte composition;

(c) selecting a low boiling point non aqueous solvent comprising at least one of a gamma valerolactone, diethoxyethane, tetrahydranofuran, 2-methyltetrahydranofuran, 1,3-dioxane, methyl acetate, methyl polypropylene oxide, dimethyl carbonate, and ethylmethyl carbonate;

(d) selecting the low boiling point solvent that has a boiling point less than 110 deg. C.;

(e) diluting the gel forming electrolyte composition into a mixture of a high-boiling-point non aqueous solvent and selecting the high and low boiling point solvents so that the boiling points are at least 50 deg. C. apart;

(f) forming the diluted gel forming electrolyte composition into a sol form;

(g) forming the sol form to have a viscosity between 1 cp to 50 cp;

(h) vaporizing the low boiling point solvent;

(h) applying the sol form to a surface of a positive electrode active material layer and to a surface of a negative electrode active material layer;

(i) laminating the positive electrode active material layer and the negative electrode active material layer to hold the sol form therebetween; and (j) placing a porous separator between the positive and negative active material layers, the porous separator having a porosity between 30% and 60%.

20. The method of claim 19, wherein the polymer material is polyvinylidene fluoride or a copolymer thereof.

* * * * *